(12) United States Patent
Tokoro et al.

(10) Patent No.: US 12,522,222 B2
(45) Date of Patent: Jan. 13, 2026

(54) ZERO POINT ESTIMATION DEVICE, ZERO POINT ESTIMATION METHOD, AND NON-TRANSITORY COMPUTER-READABLE MEDIUM

(71) Applicants: JTEKT CORPORATION, Kariya (JP); J-QuAD DYNAMICS INC., Tokyo (JP)

(72) Inventors: Hirotaka Tokoro, Tokyo (JP); Nobuhiro Nitta, Tokyo (JP)

(73) Assignees: JTEKT CORPORATION, Kariya (JP); J-QuAD DYNAMICS INC., Tokyo (JP)

( * ) Notice: Subject to any disclaimer, the term of this patent is extended or adjusted under 35 U.S.C. 154(b) by 0 days.

(21) Appl. No.: 18/726,527

(22) PCT Filed: Dec. 27, 2022

(86) PCT No.: PCT/JP2022/048079
§ 371 (c)(1),
(2) Date: Jul. 3, 2024

(87) PCT Pub. No.: WO2023/136129
PCT Pub. Date: Jul. 20, 2023

(65) Prior Publication Data
US 2025/0026357 A1 Jan. 23, 2025

(30) Foreign Application Priority Data
Jan. 11, 2022 (JP) .................................. 2022-002354

(51) Int. Cl.
*B60W 10/20* (2006.01)
*B60W 40/114* (2012.01)
(Continued)

(52) U.S. Cl.
CPC .......... *B60W 40/114* (2013.01); *B60W 10/20* (2013.01); *B60W 50/14* (2013.01);
(Continued)

(58) Field of Classification Search
CPC .... B60W 10/20; B60W 40/114; B60W 50/14; B60W 2520/14; B60W 2520/22;
(Continued)

(56) References Cited

U.S. PATENT DOCUMENTS 5,829,847 A * 11/1998 Tozu .................... B60T 8/1755
303/169
9,290,202 B2 3/2016 Lavoie
(Continued)

FOREIGN PATENT DOCUMENTS

JP 2012-063184 A 3/2012
WO 2020/234440 A1 11/2020

OTHER PUBLICATIONS

Mar. 28, 2023 Search Report issued in International Patent Application No. PCT/JP2022/048079.

*Primary Examiner* — Hai H Huynh
*Assistant Examiner* — Johnny H Hoang
(74) *Attorney, Agent, or Firm* — Oliff PLC

(57) ABSTRACT

A zero point estimation device is configured to perform a first acquisition process, a second acquisition process, and a zero point estimation process. The first acquisition process is a process of acquiring a plurality of first detection values of a first sensor sampled at different timings from each other while a vehicle is traveling with a change in a direction of travel. The second acquisition process is a process of acquiring a plurality of second detection values of a second sensor sampled in synchronization with the sampling timings of the first detection values to be acquired by the first acquisition process. The zero point estimation process is a process of (Continued)

estimating a zero point of the second sensor by using, as inputs, the plurality of first detection values acquired by the first acquisition process and the plurality of second detection values acquired by the second acquisition process.

12 Claims, 8 Drawing Sheets

(51) Int. Cl.
  *B60W 50/14* (2020.01)
  *B62D 13/06* (2006.01)

(52) U.S. Cl.
  CPC ....... *B62D 13/06* (2013.01); *B60W 2050/146* (2013.01); *B60W 2300/14* (2013.01); *B60W 2520/14* (2013.01); *B60W 2520/22* (2013.01); *B60W 2540/18* (2013.01)

(58) Field of Classification Search
  CPC ......... B60W 2540/18; B60W 2300/14; B60W 2050/146; G01C 19/00; B62D 13/00; B62D 13/06; B62D 15/023; B62D 15/024; B62D 53/00; G01D 3/00
  USPC ...................................................... 701/41–48
  See application file for complete search history.

(56) References Cited

U.S. PATENT DOCUMENTS

| | | | |
|---|---|---|---|
| 12,384,295 B2* | 8/2025 | Gali | ................... B60R 1/002 |
| 2016/0039456 A1 | 2/2016 | Lavoie et al. | |
| 2017/0259829 A1* | 9/2017 | Heckmann | ............... B62J 50/22 |
| 2017/0297619 A1 | 10/2017 | Lavoie et al. | |
| 2018/0188029 A1* | 7/2018 | Oka | ................... G01C 19/5776 |
| 2018/0202833 A1* | 7/2018 | Suzuki | ................... G01C 21/12 |
| 2018/0276839 A1* | 9/2018 | Diessner | ................... G06T 7/74 |
| 2020/0398858 A1* | 12/2020 | Kamiya | ................... G08G 1/166 |
| 2021/0215485 A1* | 7/2021 | Ishigami | ................... G01S 19/52 |
| 2022/0222850 A1 | 7/2022 | Turner | |

* cited by examiner

ZERO POINT ESTIMATION DEVICE, ZERO POINT ESTIMATION METHOD, AND NON-TRANSITORY COMPUTER-READABLE MEDIUM

CROSS-REFERENCE TO RELATED APPLICATIONS

This application is national stage application of International Application No. PCT/JP2022/048079, filed on Dec. 27, 2022, which claims the benefit of priority from Japanese Patent Application No. 2022-002354, filed on Jan. 11, 2022, the entire contents of each of which are incorporated herein by reference.

TECHNICAL FIELD

The present disclosure relates to zero point estimation devices, zero point estimation methods, and zero point estimation programs.

BACKGROUND ART

For example, Patent Document 1 below describes a combination vehicle including a trailer that is towed by a tractor. In this document, a device that controls the combination vehicle uses a detection value of a hitch angle sensor for detecting a hitch angle that is an angle between the front-rear direction of the tractor and the front-rear direction of the trailer. The device also estimates the zero point of the hitch angle sensor in a straight traveling state.

RELATED ART DOCUMENTS

Patent Documents

Patent Document 1: U.S. Pat. No. 9,290,202

SUMMARY OF THE INVENTION

Problem to be Solved by the Invention

In the case of the above device, it is essential to cause the combination vehicle to travel straight in order to estimate the zero point.

Means for Solving the Problem

One aspect of the present disclosure provides a zero point estimation device. The zero point estimation device is applied to a vehicle equipped with a first sensor and a second sensor. The first sensor is a sensor for detecting a physical quantity that changes according to a yaw motion of the vehicle. The second sensor is a sensor for detecting a physical quantity that changes according to the yaw motion of the vehicle and that is different from the physical quantity to be detected by the first sensor. The first sensor has been subjected to zero point correction. The zero point estimation device is configured to perform a first acquisition process, a second acquisition process, and a zero point estimation process. The first acquisition process is a process of acquiring a plurality of first detection values sampled at different timings from each other while the vehicle is traveling with a change in a direction of travel. The first detection values are detection values of the first sensor. The second acquisition process is a process of acquiring a plurality of second detection values sampled in synchronization with sampling timings of the first detection values to be acquired by the first acquisition process. The second detection values are detection values of the second sensor. The zero point estimation process is a process of estimating a zero point of the second sensor by using, as inputs, the plurality of first detection values acquired by the first acquisition process and the plurality of second detection values acquired by the second acquisition process.

Another aspect of the present disclosure provides a zero point estimation method. The zero point estimation method is applied to a vehicle equipped with a first sensor and a second sensor. The first sensor is a sensor for detecting a physical quantity that changes according to a yaw motion of the vehicle. The second sensor is a sensor for detecting a physical quantity that changes according to the yaw motion of the vehicle and that is different from the physical quantity to be detected by the first sensor. The first sensor has been subjected to zero point correction. The zero point estimation method includes performing a first acquisition process, a second acquisition process, and a zero point estimation process. The first acquisition process is a process of acquiring a plurality of first detection values sampled at different timings from each other while the vehicle is traveling with a change in a direction of travel. The first detection values are detection values of the first sensor. The second acquisition process is a process of acquiring a plurality of second detection values sampled in synchronization with sampling timings of the first detection values to be acquired by the first acquisition process. The second detection values are detection values of the second sensor. The zero point estimation process is a process of estimating a zero point of the second sensor by using, as inputs, the plurality of first detection values acquired by the first acquisition process and the plurality of second detection values acquired by the second acquisition process.

Still another aspect of the present disclosure provides a zero point estimation program. The zero point estimation program is applied to a vehicle equipped with a first sensor and a second sensor. The first sensor is configured to detect a physical quantity that changes according to a yaw motion of the vehicle. The second sensor is configured to detect a physical quantity that changes according to the yaw motion of the vehicle and that is different from the physical quantity to be detected by the first sensor. The first sensor has been subjected to zero point correction. The zero point estimation program includes instructions to cause a computer to perform a first acquisition process, a second acquisition process, and a zero point estimation process. The first acquisition process is a process of acquiring a plurality of first detection values sampled at different timings from each other while the vehicle is traveling with a change in a direction of travel. The first detection values are detection values of the first sensor. The second acquisition process is a process of acquiring a plurality of second detection values sampled in synchronization with sampling timings of the first detection values to be acquired by the first acquisition process. The second detection values are detection values of the second sensor. The zero point estimation process is a process of estimating a zero point of the second sensor by using, as inputs, the plurality of first detection values acquired by the first acquisition process and the plurality of second detection values acquired by the second acquisition process.

MODES FOR CARRYING OUT THE INVENTION

First Embodiment

A first embodiment will be described below with reference to the drawings.

Configuration of Combination Vehicle

Figure 1:
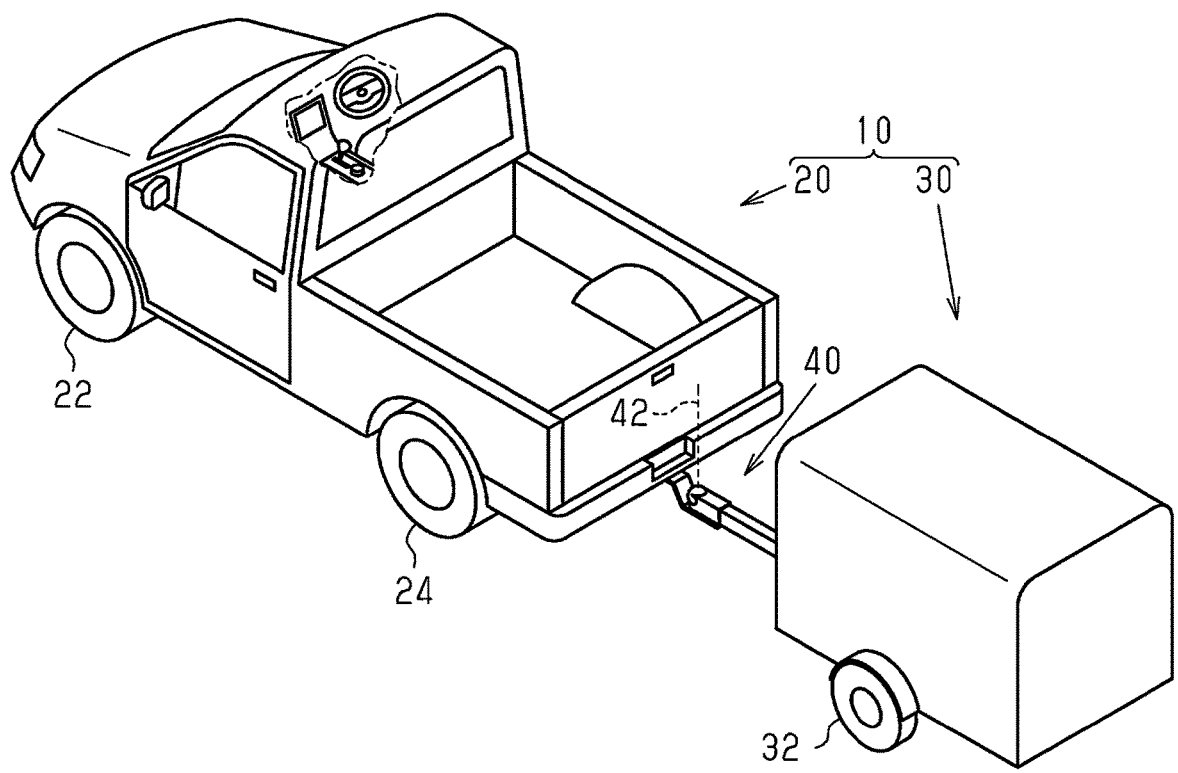
FIG. 1 is a perspective view showing the configuration of a combination vehicle according to a first embodiment.

As shown in FIG. 1, a combination vehicle 10 includes a tractor 20 and a trailer 30. FIG. 1 illustrates, as the tractor 20, a pickup truck that is one type of small truck. The tractor 20 includes front wheels 22 and rear wheels 24. The front wheels 22 include two wheels, namely a right front wheel and a left front wheel, and the rear wheels 24 include two wheels, namely a right rear wheel and a left rear wheel. FIG. 1 illustrates an enclosed box trailer as the trailer 30. The trailer 30 includes wheels 32. The wheels 32 include two wheels, namely a right wheel and a left wheel.

The trailer 30 is connected to the rear of the tractor 20 via a ball joint 40. The ball joint 40 is a member that connects the trailer 30 to the tractor 20 so as to be rotatable about an axis 42. The axis 42 extends in the height direction of the tractor 20.

Figure 2:
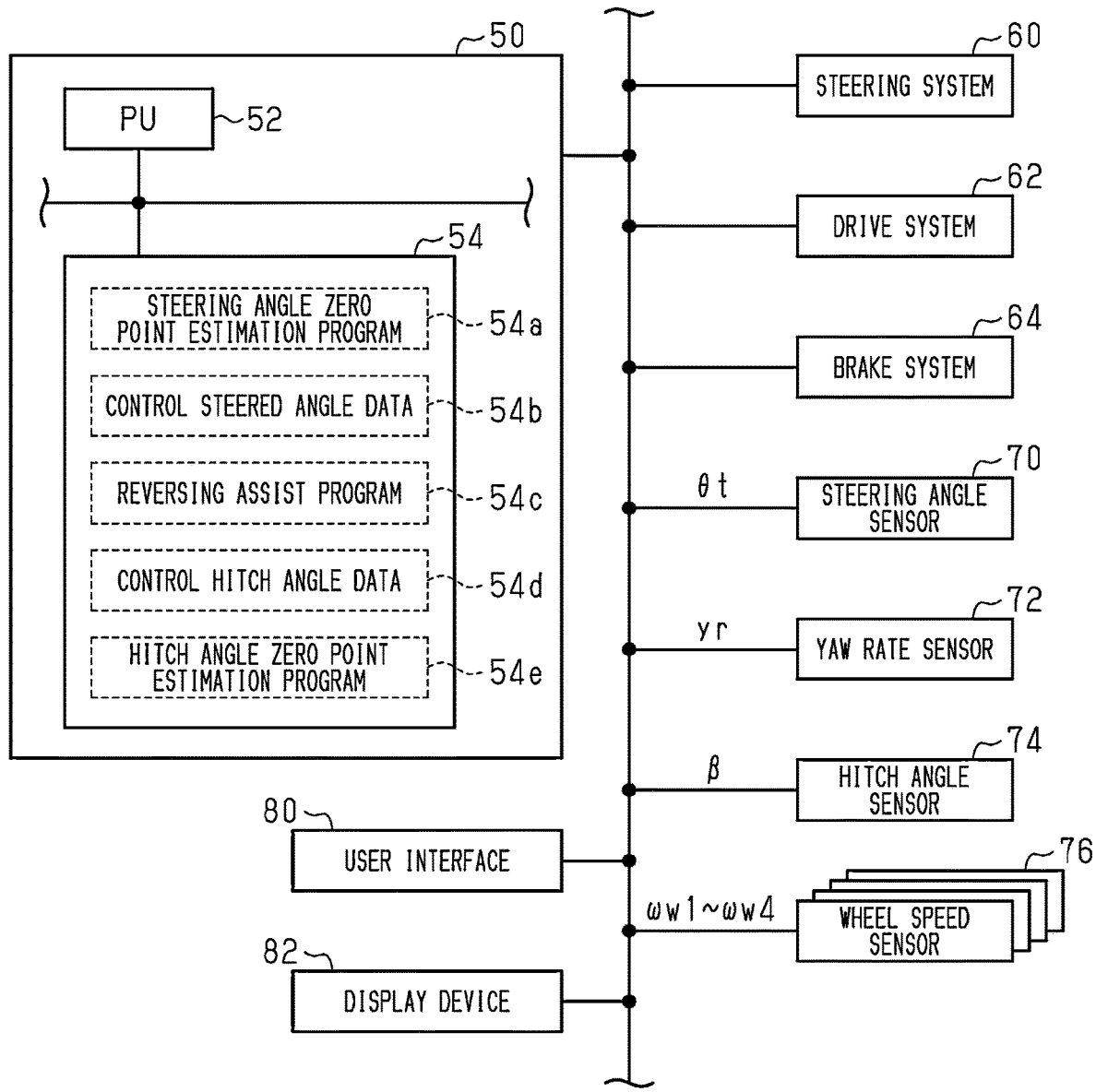
FIG. 2 is a block diagram showing the configuration of a control system according to the embodiment.

FIG. 2 illustrates some of members of the tractor 20. As shown in FIG. 2, the tractor 20 includes a control device 50. The control device 50 operates a steering system 60, a drive system 62, and a brake system 64 in order to control controlled variables of the combination vehicle 10 as a controlled object. The controlled variables include a vehicle speed, a direction of travel, and a hitch angle. The hitch angle is an angle between the front-rear direction of the tractor 20 and the front-rear direction of the trailer 30.

The steering system 60 includes a steering actuator that steers steered wheels. The steered wheels are, for example, the front wheels 22 shown in FIG. 1. The steering system 60 may include a steering control device that operates the steering actuator. In that case, the "control device 50 operates the steering system 60" means that the control device 50 outputs command signals to the steering control device.

The drive system 62 includes at least one of the following two devices as a thrust generation device for the vehicle: an internal combustion engine and a rotating electric machine. The drive system 62 may include a drive control device that controls the internal combustion engine and the rotating electrical machine. In that case, the "control device 50 operates the drive system 62" means that the control device 50 outputs command signals to the drive control device.

The brake system 64 includes at least one of the following two devices: a device that reduces the speed of rotation of the wheels using a frictional force, and a device that reduces the speed of rotation of the wheels by converting the power of the wheels into electrical energy. The device that reduces the speed of rotation of the wheels by converting the power of the wheels into electrical energy may be shared with the rotating electric machine of the drive system. The brake system 64 may include a brake control device that controls the devices that reduce the speed of rotation of the wheels. In that case, the "control device 50 operates the brake system 64" means that the control device 50 outputs command signals to the brake control device.

The control device 50 refers to a steered angle θt of the steered wheels detected by a steering angle sensor 70 and a yaw rate yr detected by a yaw rate sensor 72, in order to control the controlled variables. The steered angle θt is a value that takes a positive sign for one of a right turn and a left turn and takes a negative sign for the other. The steered angle θt is the turning angle of tires. For example, when the steering system 60 includes a rack and pinion mechanism, the steering angle sensor 70 may be a sensor for detecting a pinion angle. In that case, however, the control device 50 performs a process of converting the pinion angle into the turning angle of the tires. Hereinafter, for convenience of description, the turning angle of the tires is regarded as a detection value of the steering angle sensor 70, even if the turning angle is obtained by the above conversion process.

The control device 50 also refers to a hitch angle β detected by a hitch angle sensor 74 and wheel speeds Ωw1 to Ωw4 detected by wheel speed sensors 76. The hitch angle β may take either a positive sign or a negative sign depending on the angle between the direction of travel of the tractor 20 from rear to front and the direction of travel of the trailer 30 from rear to front. For example, the hitch angle β may take a positive sign when the direction of travel of the trailer 30 from rear to front deviates counterclockwise from the direction of travel of the tractor 20 from rear to front by less than 180°. The wheel speeds Ωw1, Ωw2 are the rotational speed of the right front wheel 22 and the rotational speed of the left front wheel 22, respectively. The wheel speeds Ωw3, Ωw4 are the rotational speed of the right rear wheel 24 and the rotational speed of the left rear wheel 24, respectively. The control device 50 sets control of the controlled variables according to the operation state of a user interface 80. The user interface 80 is used to transmit intentions of a user to the control device 50, such as an intention to select one of the following two drivings: autonomous driving and manual driving.

The control device 50 includes a PU 52 and a storage device 54. The PU 52 is a software processing device including at least one of the following: a CPU, a GPU, a TPU, etc. The storage device 54 stores a steering angle zero point estimation program 54a and a reversing assist program 54c.

The steering angle zero point estimation program 54a defines a command to cause the PU 52 to perform a zero point correction process for the steered angle θt detected by the steering angle sensor 70. The zero point correction process is a process of compensating for the difference between the steered angle θt and zero. The zero point correction process includes a process of calculating the difference between the steered angle θt and zero when the combination vehicle 10 is traveling straight. The zero point correction process also includes a process of correcting the sequentially sampled steered angles θt using the calculated differences and storing the corrected steered angles θt in the storage device 54 as control steered angle data 54b. The control steered angle data 54b is data on the zero-point corrected steered angles θt.

The reversing assist program 54c defines a command for a process that is to be performed by the PU 52 to cause the combination vehicle 10 to reverse automatically. This process is performed using control hitch angle data 54d, the steered angle θt, and the wheel speeds Ωw1 to Ωw4 input to the storage device 54. Specifically, after setting a target travel trajectory, the PU 52 operates the steering system 60, the drive system 62, and the brake system 64 in order to control the travel trajectory of the combination vehicle 10 to the target travel trajectory.

The control hitch angle data 54d is data on the hitch angles β detected by the hitch angle sensor 74 and zero-point corrected. A process for the zero point correction of the hitch angle will be described in detail below.

Process for Zero Point Correction of Hitch Angle

Figure 3:
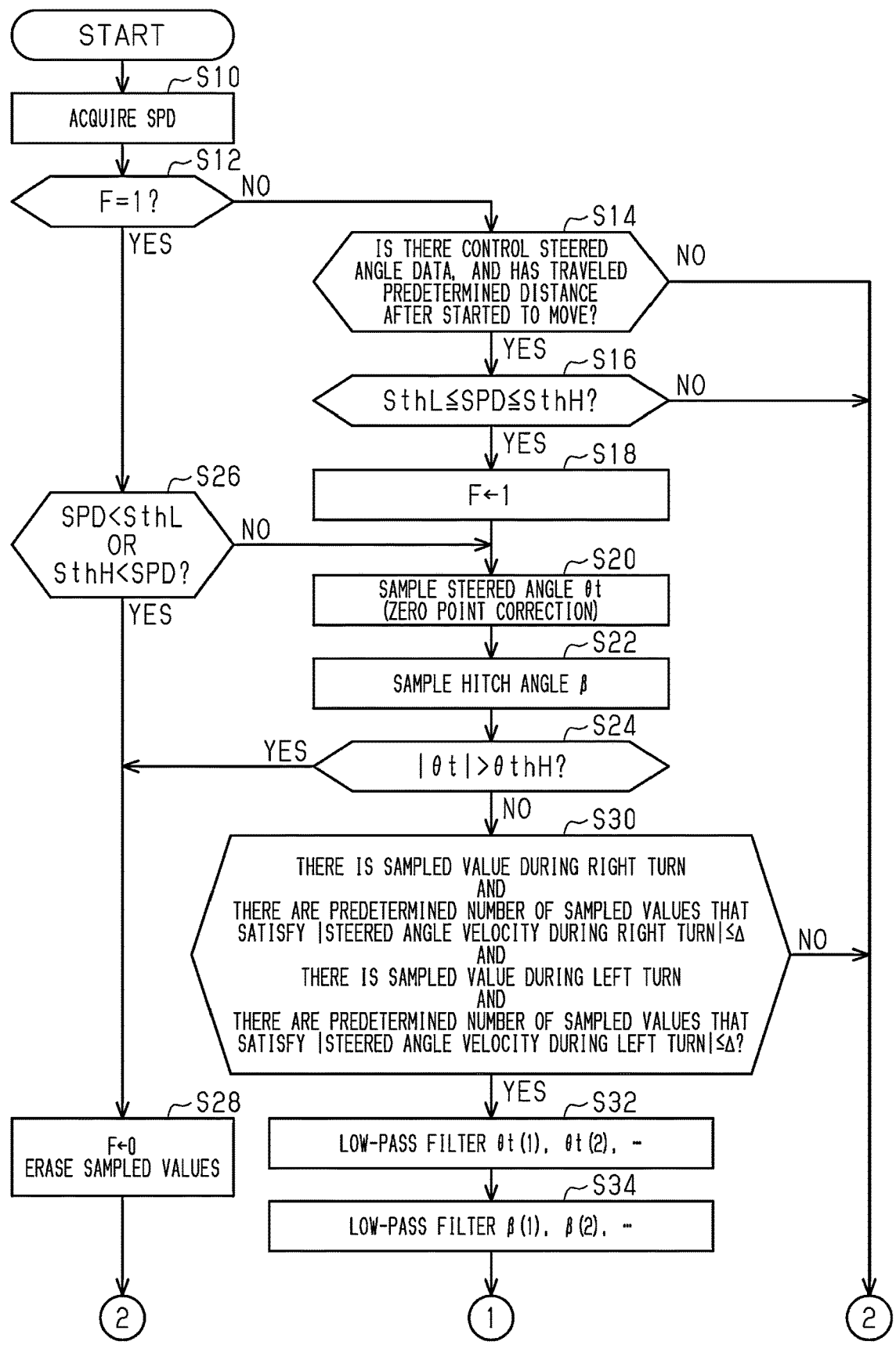
FIG. 3 is a flowchart showing the procedure of a process that is performed by a control device according to the embodiment.
Figure 4:
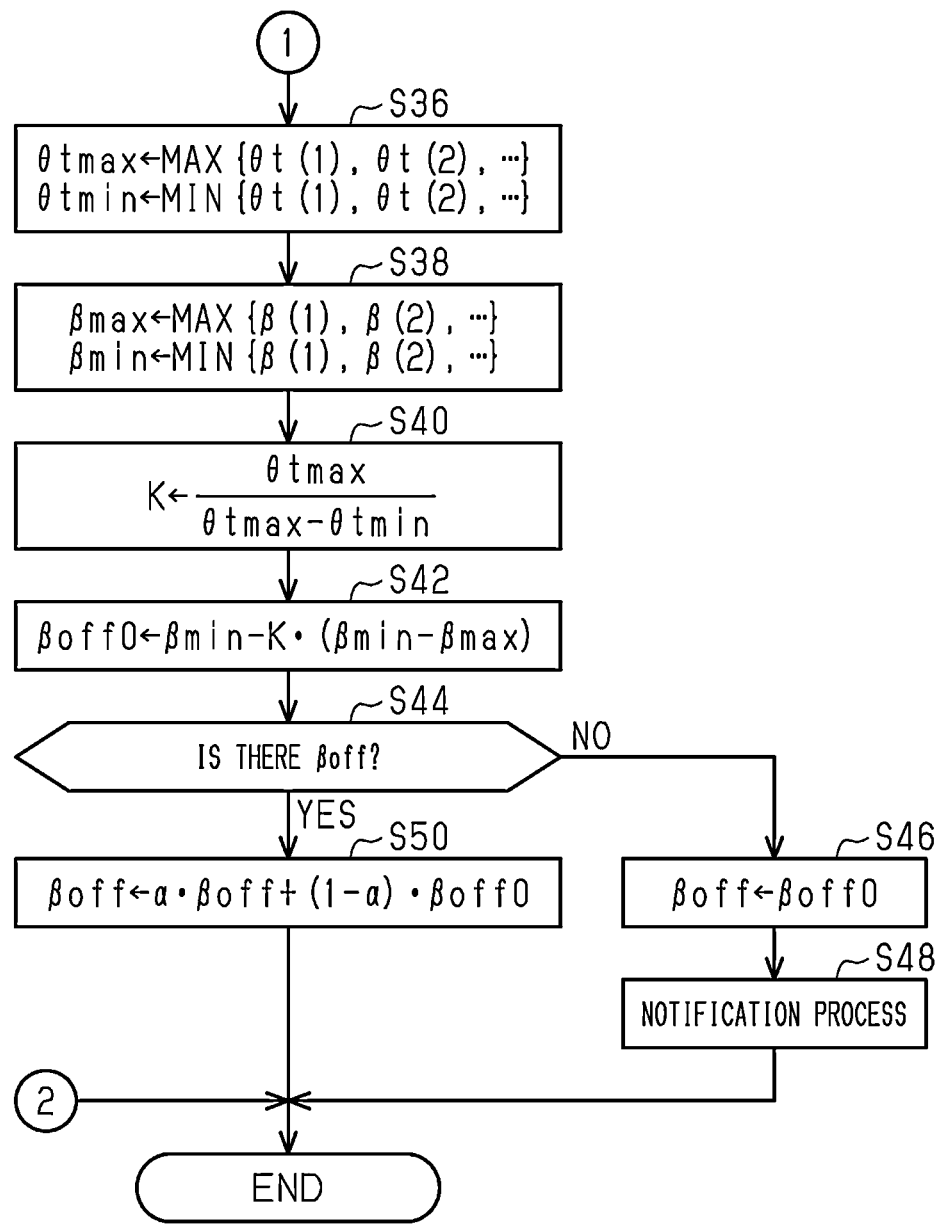
FIG. 4 is a flowchart showing the procedure of the process that is performed by the control device according to the embodiment.

FIGS. 3 and 4 show the procedure of a hitch angle zero point estimation process. The process shown in FIGS. 3 and 4 is implemented by the PU 52 repeatedly executing a hitch angle zero point estimation program 54e stored in the storage device 54 at, for example, a predetermined cycle. In the following description, the numbers preceded by the letter "S" represent step numbers of each process.

In the series of processes shown in FIGS. 3 and 4, the PU 52 first acquires a vehicle speed SPD that is a travel speed of the combination vehicle 10 (S10). The vehicle speed SPD is calculated each time by the PU 52 based on the wheel speeds Ωw1 to Ωw4. The vehicle speed SPD may be, for example, a value obtained by converting the average value of the wheel speeds Ωw1 to Ωw4 into a translational speed. Next, the PU 52 determines whether a permission flag F is "1" (S12). The permission flag F is set to "1" when sampling of the steered angle θt and the hitch angle β is permitted in order to use the sampled angles as inputs for zero point learning of the hitch angle β. The permission flag F is set to "0" when this sampling is not permitted.

When the PU 52 determines that the permission flag F is "0" (S12: NO), the PU 52 determines whether a logical conjunction of the following conditions (A), (B) is true (S14).
Condition (A): a condition that zero point learning of the steered angle θt has been performed and the control steered angle data 54b is updated sequentially. Condition (A) is a condition that a reference signal to be used to learn the hitch angle β is available.

Condition (B): a condition that the combination vehicle 10 has traveled a predetermined distance or more after it started to move. In other words, the condition (B) is a condition that a predetermined period of time has elapsed since the vehicle started to move.
When the PU 52 determines that the logical conjunction is true (S14: YES), the PU 52 determines whether a condition (C) that the vehicle speed SPD is equal to or more than a lower limit speed SthL and equal to or less than an upper limit speed SthH is satisfied (S16). When the PU 52 determines that the condition (C) is satisfied (S16: YES), the PU 52 sets the permission flag F to "1" (S18).

The PU 52 then samples the steered angle θt (S20). This process includes a process of storing the sampled value in an area of the storage device 54 that stores data for zero point learning. The steered angle θt here is a value indicated by the control steered angle data 54b stored in the storage device 54. The PU 52 also samples the hitch angle β detected by the hitch angle sensor 74 (S22). This process includes a process of storing the sampled value in an area of the storage device 54 that stores data for zero point learning. The process of S20 and the process of S22 are performed in synchronization with each other. In other words, the steered angle θt sampled in the process of S20 and the hitch angle β sampled in the process of S22 can be regarded as values sampled at the same detection timing.

Thereafter, the PU 52 determines whether the absolute value of the steered angle θt sampled in the process of S20 is larger than a learning upper limit value θthH (S24). On the other hand, when the PU 52 determines that the permission flag F is "1" (S12: YES), the PU 52 determines whether the above condition (C) is not satisfied (S26). In other words, the PU 52 determines whether a logical disjunction of the vehicle speed SPD being smaller than the lower limit value SthL and being greater than the upper limit value SthH is true. When the PU 52 determines that the condition (C) is satisfied (S26: NO), the process proceeds to S20. On the other hand, when the PU 52 determines that condition (C) is not satisfied (S26: YES) and when YES in the process of S24, the PU 52 sets the permission flag F to "0" and erases the data sampled in the processes of S20, S22 (S28).

On the other hand, when NO in the process of S24, the PU 52 determines whether a logical conjunction of the following conditions (D) to (G) is true (S30).
Condition (D): a condition that any of the steered angles θt stored in the storage device 54 by the process of S20 has a value during a right turn.
Condition (E): a condition that a predetermined number of steered angles θt out of the steered angles θt stored in the storage device 54 by the process of S20 satisfy that the absolute value of the steered angle velocity during a right turn is equal to or less than a specified value Δ. This process is a process of determining whether there is a history of the steered angle becoming a steady state during a right turn.
Condition (F): a condition that any of the steered angles θt stored in the storage device 54 by the process of S20 has a value during a left turn.
Condition (G): a condition that a predetermined number of steered angles θt out of the steered angles θt stored in the storage device 54 by the process of S20 satisfy that the absolute value of the steered angle velocity during a left turn is equal to or less than the specified value Δ. This process is a process of determining whether there is a history of the steered angle becoming a steady state during a left turn.

When the PU 52 determines that a logical conjunction of the conditions (D) to (G) is true (S30: YES), the PU 52 low-pass filters the time series data of the steered angle θt stored in the storage device 54 by the process of S20 (S32). In FIG. 3, the time series data is represented by "θt(1), θt(2), . . . " The numerals in parentheses following "θt" are sampling numbers. Adjacent sampling numbers mean adjacent sampling timings.

The PU 52 also low-pass filters the time series data of the hitch angle β stored in the storage device 54 by the process of S22 (S34). In FIG. 3, the time series data is represented by "β(1), β(2), . . . "

The low-pass filter used in the process of S32 and the low-pass filter used in the process of S34 have the same cutoff frequency. In the processes of S32, S34, a dead zone may be provided in which values near the zero point are treated as zero. In that case, however, the width of the dead zone is the same between the processes of S32, S34.

Subsequently, the PU 52 substitutes the maximum value in the low-pass filtered time series data of the steered angle θt for a maximum steered angle θtmax, and substitutes the minimum value for a minimum steered angle θtmin (FIG. 4: S36). This process corresponds to the first acquisition process of acquiring a plurality of first detection values sampled at different timings. The PU 52 also substitutes the maximum value in the low-pass filtered time series data of the hitch angle β for a maximum hitch angle βmax, and substitutes the minimum value for a minimum hitch angle βmin (S38). This process corresponds to the second acquisition process of acquiring a plurality of second detection values sampled in synchronization with the sampling timings of the first detection values.

The PU 52 then substitutes a value obtained by dividing the maximum steered angle θtmax by the "maximum steered angle θtmax minus the minimum steered angle θtmin" for a ratio factor K (S40). This process corresponds to the ratio factor calculation process. Subsequently, the PU 52 calculates an offset amount βoff0 that is the amount of deviation of the zero point of the hitch angle β, based on the following expression (c1) (S42).

$$\beta off0 = \beta min - K \cdot (\beta min - \beta max) \quad (c1)$$

Figure 5:
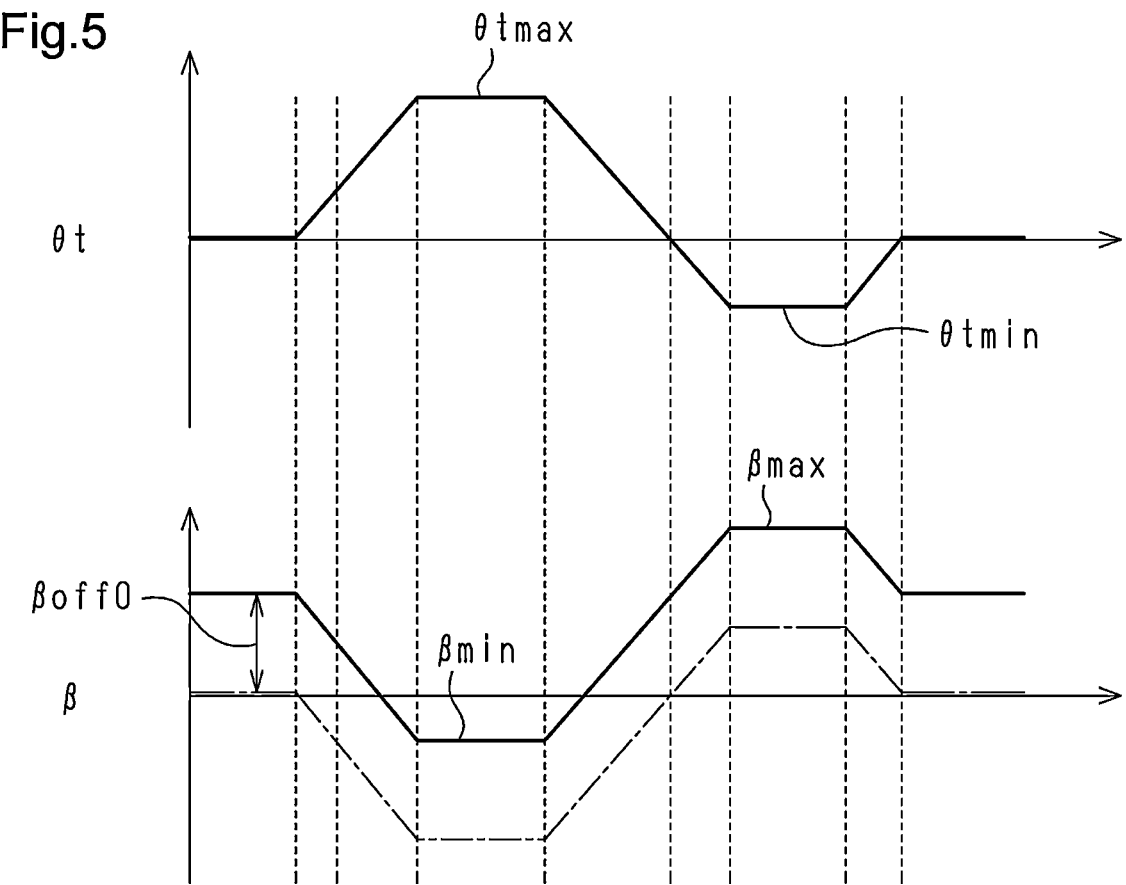
FIG. 5 is a timing chart illustrating a zero point estimation method according to the embodiment.

FIG. 5 illustrates the process of calculating the offset amount βoff0. In the following description, it is assumed that a value on the right turn side is positive.

When the steered angle θt has a value on the right turn side, the hitch angle β has a value on the left turn side. When the steered angle θt has a value on the left turn side, the hitch angle β has a value on the right turn side. In FIG. 5, the hitch angle β when the zero point is correct is shown by a long dashed short dashed line. In FIG. 5, the continuous line shows the hitch angle β when there is an error in the zero point. As shown in FIG. 5, when there is no error in the zero point, the hitch angle β and the steered angle θt have similar waveforms but opposite signs. Therefore, the ratio between the maximum steered angle θtmax and the absolute value of the minimum hitch angle βmin can be considered to be equal to the ratio between "θtmax−θtmin" and "βmax−βmin."

This means that the absolute value of the minimum hitch angle βmin is as follows.

$$\theta tmax \cdot (\beta max - \beta min)/(\theta tmax - \theta tmin)$$

Therefore, the minimum hitch angle with no zero point error is given by the following expression.

$$\theta tmax \cdot (\beta max - \beta min)/(\theta tmax - \theta tmin) = K \cdot (\beta min - \beta max)$$

The offset amount βoff0 is the difference between the minimum sampled hitch angle βmin and the above minimum hitch angle with no zero point error, and is therefore equal to the right side of the expression (c1).

Referring back to FIG. 4, the PU 52 determines whether an offset amount βoff has already been calculated and stored (S44). When the PU 52 determines that no offset amount βoff has been stored yet (S44: NO), the PU 52 substitutes the offset amount βoff0 for the offset amount βoff (S46). The PU 52 then operates a display device 82 shown in FIG. 2 to perform, as a process of notifying the user that the zero point learning has been performed, a process of displaying visual information indicating that the zero point learning has been performed (S48).

On the other hand, when the PU 52 determines that an offset amount βoff has already been stored (S44: YES), the PU 52 updates the stored offset amount βoff (S50). Specifically, the PU 52 substitutes an exponential moving average value of the offset amount βoff that has already been stored and the offset amount βoff0 newly calculated in the process of S42 for the offset amount βoff (S50). FIG. 4 shows an example in which the weighting factor of the offset amount βoff that has already been stored is "α" and the weighting factor of the offset amount βoff0 newly calculated in the process of S42 is "1-a," where "0<α<1." The processes of S40 to S46 and S50 correspond to the zero point estimation process.

The PU 52 ends the series of processes shown in FIGS. 3 and 4 when the process of S28, S48, or S50 is completed and when NO in the process of S14, S16, or S30.

Figure 6:
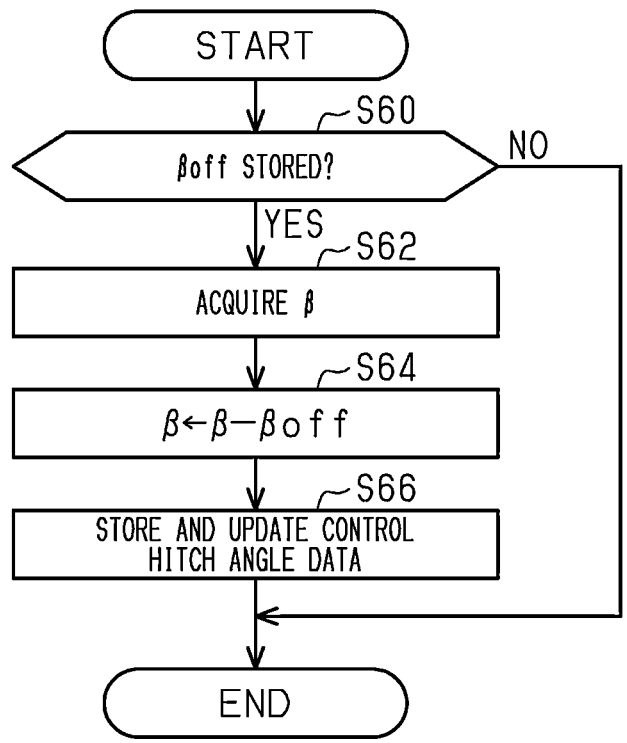
FIG. 6 is a flowchart showing the procedure of a process that is performed by the control device according to the embodiment.

FIG. 6 shows the procedure of a process of updating the control hitch angle data 54d. The process shown in FIG. 6 is implemented by the PU 52 repeatedly executing the hitch angle zero point estimation program 54e stored in the storage device 54 at, for example, the sampling cycle of the hitch angle β.

In the series of processes shown in FIG. 6, the PU 52 first determines whether an offset amount βoff has already been stored (S60). When the PU 52 determines that an offset amount βoff has already been stored yet (S60: YES), the PU 52 acquires the most recent sampled value of the hitch angle β (S62). Next, the PU 52 substitutes a value obtained by subtracting the offset amount βoff from the hitch angle β for the hitch angle β (S64). This process corresponds to the zero point correction process. The PU 52 then updates the control hitch angle data 54d stored in the storage device 54 with the value calculated in the process of S64 (S66).

The PU 52 ends the series of processes shown in FIG. 6 when the process of S66 is completed and when NO in the process of S60.

Functions and Effects of Embodiment

After detecting the zero point of the steered angle θt, the PU 52 calculates the offset amount βoff that is an error in the zero point of the hitch angle β, based on the similarity between the waveform data of the steered angle θt and the waveform data of the hitch angle β. It is therefore possible to detect the zero point of the hitch angle β even when the combination vehicle 10 is not traveling straight.

According to the embodiment described above, the following functions and effects can further be obtained.

(1) The PU 52 estimates the zero point of the hitch angle sensor 74 using both the hitch angle β sampled during a right turn and the hitch angle β sampled during a left turn. Therefore, the difference between the two hitch angles β is large compared to the case where only one of the hitch angle β sampled when the vehicle is turning right and the hitch angle β sampled when the vehicle is turning left is included.

Accordingly, it is possible to improve the SN ratio compared to the case where only one of the above two hitch angles β is included.

(2) The PU 52 calculates the offset amount βoff based on the sampled values of the steered angle θt and the hitch angle β in both the steady state during a right turn and the steady state during a left turn. Therefore, it is possible to improve the calculation accuracy of the offset amount βoff compared to the case where sampled values in a non-steady state are used.

Figure 7:
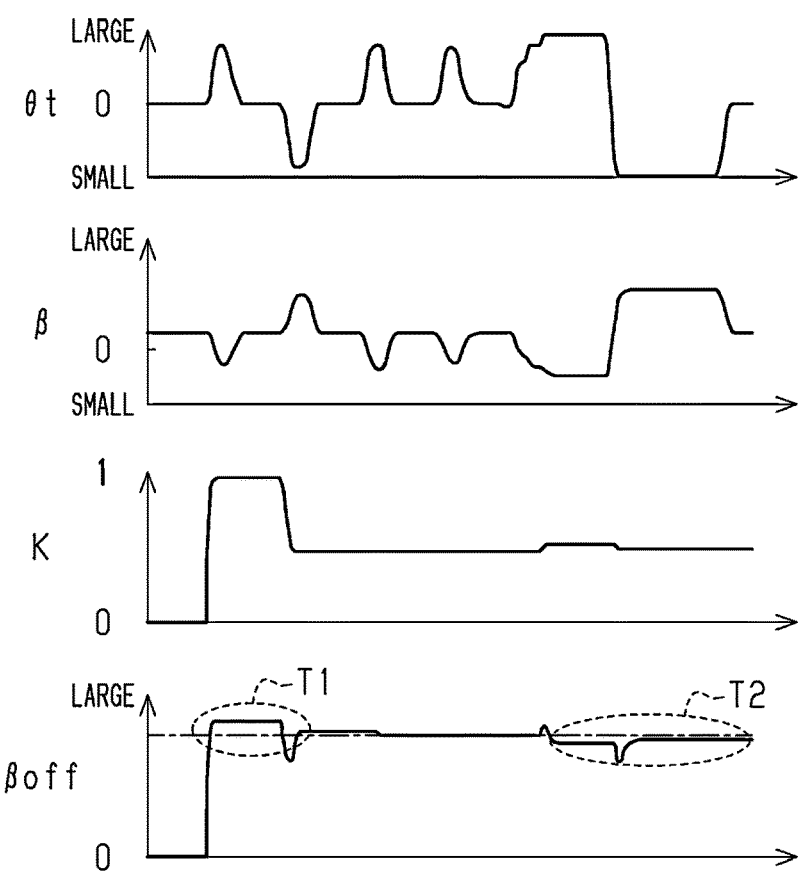
FIG. 7 is a timing chart illustrating effects of the embodiment.

FIG. 7 shows changes in steered angle θt, hitch angle β, ratio factor K, and offset amount βoff. FIG. 7 shows the case where the offset amount βoff is calculated without taking the above conditions (E), (G) into account. As shown in FIG. 7, the offset amount βoff during a period T1 in which a turn is not steady deviates from a true value shown by a long dashed short dashed line in the figure.

(3) The PU 52 calculates the offset amount βoff based on the sampled values of the steered angle θt and the hitch angle β when the absolute value of the steered angle θt is equal to or less than the learning upper limit value θthH. This can improve the calculation accuracy of the offset amount βoff compared to the case where the sampled values when the absolute value of the steered angle θt is larger than the learning upper limit value θthH are used.

A period T2 in FIG. 7 shows a case where the offset amount βoff is calculated even when the absolute value of the steered angle θt is larger than the learning upper limit value θthH. As shown in FIG. 7, the offset amount βoff during the period T2 in which the absolute value of the steered angle θt is large deviates from the true value shown by the long dashed short dashed line in the figure.

(4) The PU 52 performs sampling for zero point estimation when the condition (B) is satisfied. The value of the hitch angle β is not certain when the combination vehicle 10 starts to move. Therefore, the waveform of the time series data of the detection values of the hitch angle sensor 74 and the waveform of the time series data of the detection values of the steering angle sensor 70 tends not to be similar immediately after the combination vehicle 10 starts to move. In this regard, providing the condition (B) makes it possible to estimate the zero point using the values sampled in a state where the waveform of the time series data of the steered angle θt and the waveform of the time series data of the hitch angle β are similar.

(5) The PU 52 performs zero point correction of the hitch angle β sampled each time and updates the control hitch angle data 54*d*. The PU 52 uses the control hitch angle data 54*d* when performing control using the hitch angle β, such as when executing the reversing assist program 54*c*. This can reduce the influence of the error of the hitch angle sensor 74 on the control.

The process in which the PU 52 operates a predetermined device according to the reversing assist program 54*c* corresponds to the operation process of operating the predetermined device based on the second detection value corrected by the zero point correction process. The predetermined device corresponds to the steering system 60 etc.

Second Embodiment

A second embodiment will be described below with reference to the drawings, focusing on the differences from the first embodiment.

In the first embodiment, the zero point of the hitch angle β is estimated when the combination vehicle 10 is driven in any manner. In the present embodiment, on the other hand, driving for estimating the zero point is provided.

Figure 8:
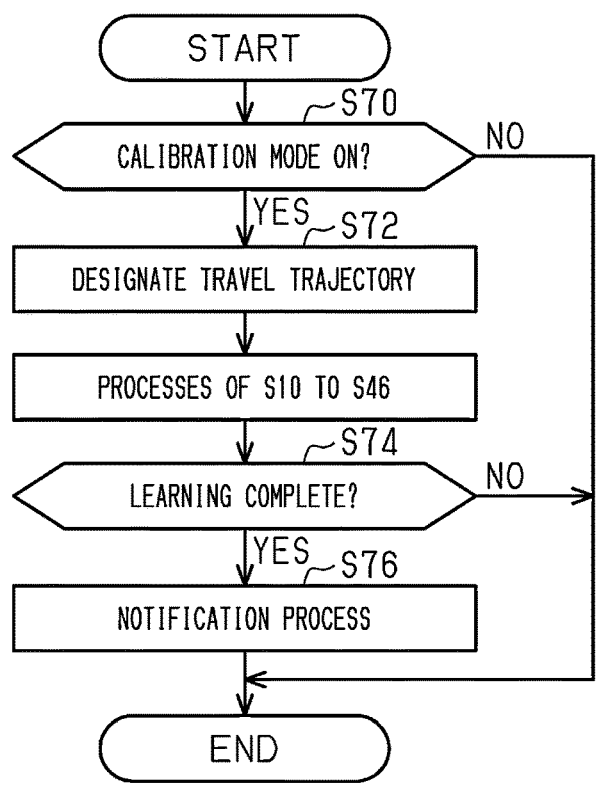
FIG. 8 is a flowchart showing the procedure of a process that is performed by a control device according to a second embodiment.

FIG. 8 shows the procedure of a zero point estimation process according to the present embodiment. The process shown in FIG. 8 is implemented by the PU 52 repeatedly executing the hitch angle zero point estimation program 54*e* stored in the storage device 54 at, for example, a predetermined cycle.

In the series of processes shown in FIG. 8, the PU 52 first determines whether a calibration mode is ON (S70). This process is a process of determining whether the user has selected driving for a zero point learning process of the hitch angle β. That is, when learning of the zero point of the hitch angle β is performed by the processes of S40, S42, etc. described above, the PU 52 operates the display device 82 to notify the user of that. Therefore, when learning of the zero point of the hitch angle β has not been performed, the user can be aware from information on the display device 82 that the learning has not been performed. In the present embodiment, the user is allowed to select to intentionally drive for the zero point learning. This can be implemented by operating the user interface 80 to select a calibration mode.

When the PU 52 determines that the calibration mode is ON (S70: YES), the PU 52 operates the display device 82 to designate a travel trajectory (S72). This process corresponds to the instruction process. For example, a travel route in which the vehicle switches from a right turn to a left turn may be designated. Alternatively, for example, a travel route in which the vehicle switches from a left turn to a right turn may be designated.

The PU 52 then performs the processes of S10 to S46 shown in FIGS. 3 and 4. Thereafter, the PU 52 determines whether learning is complete (S74). In other words, the PU 52 determines whether the processes up to S46 have been completed. When the user has driven so that the determination result in the process of S14, S16, or S30 is NO, or has driven so that the determination result in the process of S24 is YES, it is determined that learning is not complete.

When the PU 52 determines that learning is complete (S74: YES), the PU 52 operates the display device 82 shown in FIG. 2 to perform, as the process of notifying the user that the zero point learning has been performed, a process of displaying visual information indicating that the zero point learning has been performed (S76).

The PU 52 ends the series of processes shown in FIG. 8 when NO in the process of S70 or S74 and when the process of S76 is completed.

Third Embodiment

A third embodiment will be described below with reference to the drawings, focusing on the differences from the first embodiment.

In the first embodiment, the zero-point corrected steered angle θt is used as a reference signal. In the present embodiment, however, the zero-point corrected yaw rate yr is used as a reference signal. Zero point correction of the yaw rate yr is performed in the same manner as the zero point correction of the steered angle et.

Figure 9:
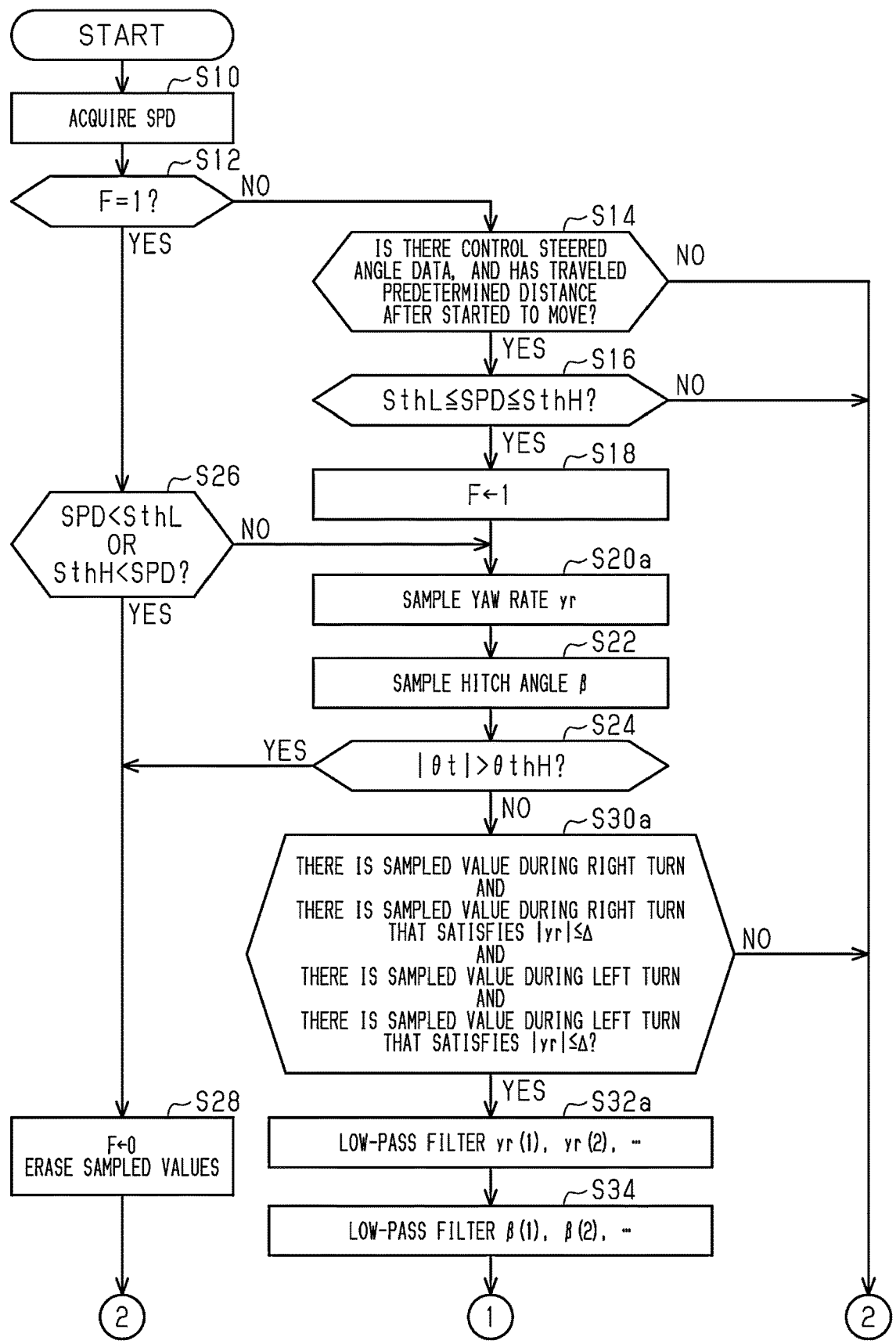
FIG. 9 is a flowchart showing the procedure of a process that is performed by a control device according to a third embodiment.
Figure 10:
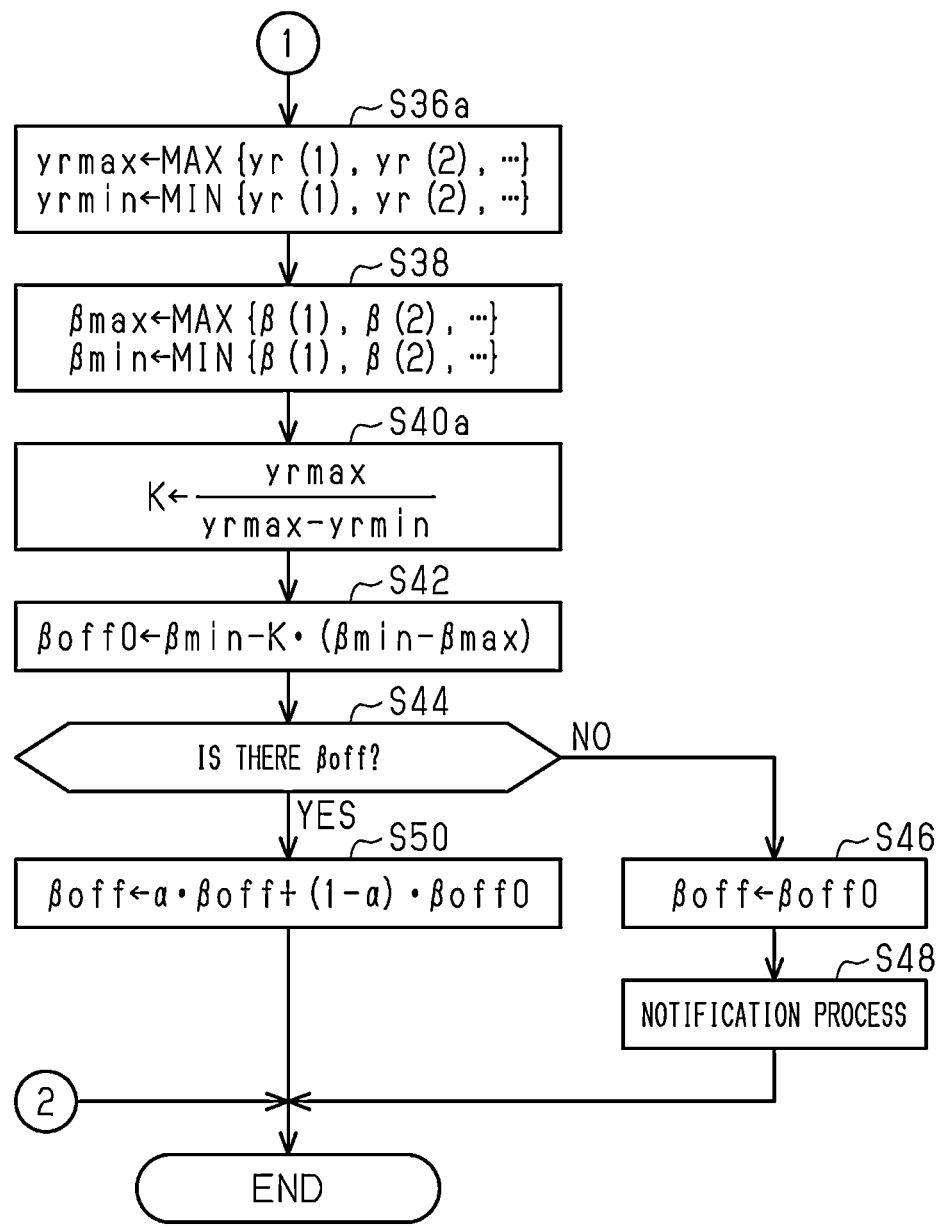
FIG. 10 is a flowchart illustrating the procedure of the process that is performed by the control device according to the third embodiment.

FIGS. 9 and 10 show the procedure of a hitch angle zero point estimation process according to the present embodiment. The process shown in FIGS. 9 and 10 is implemented by the PU 52 repeatedly executing the hitch angle zero point estimation program 54*e* stored in the storage device 54 at, for example, a predetermined cycle. In FIGS. 9 and 10, processes corresponding to the processes shown in FIGS. 3 and 4 are denoted by the same step numbers as those in FIGS. 3 and 4, and description thereof will be omitted.

In the series of processes shown in FIGS. 9 and 10, the PU 52 performs a process of sampling the yaw rate yr instead of the process of S20 (S20a). When NO in the process of S24, the PU 52 determines whether a logical conjunction of the following conditions (D1), (F1), (H), and (I) is true (S30a).

Condition (D1): a condition that any of the yaw rates yr stored in the storage device 54 by the process of S20a has a value during a right turn.
Condition (F1): a condition that any of the yaw rates yr stored in the storage device 54 by the process of S20a has a value during a left turn.
Condition (H): a condition that any of the absolute values of the sampled values of the yaw rate yr during a right turn is equal to or less than a specified value Δ.
Condition (I): a condition that any of the absolute values of the sampled values of the yaw rate yr during a left turn is equal to or less than the specified value Δ.

When the PU 52 determines that the above logical conjunction is true (S30a: YES), the PU 52 low-pass filters the time series data of the yaw rate yr stored in the storage device 54 by the process of S20a (S32a). In FIG. 9, the time series data is represented by "yr(1), yr(2), . . . " The PU 52 performs the process of S34.

The low-pass filter used in the process of S32a and the low-pass filter used in the process of S34 have the same cutoff frequency. In the processes of S32a, S34, a dead zone may be provided in which values near the zero point are treated as zero. In that case, however, the width of the dead zone is the same between the processes of S32a, S34.

When completing the process of S34, the PU 52 substitutes the maximum value in the low-pass filtered time series data of the yaw rate yr for a maximum yaw rate yrmax, and substitutes the minimum value for a minimum yaw rate yrmin (S36a: FIG. 10). This process corresponds to the first acquisition process.

When completing the process of S38, the PU 52 substitutes a value obtained by dividing the maximum yaw rate yrmax by the "maximum yaw rate yrmax minus the minimum yaw rate yrmin" for a ratio factor K (S40a). This process corresponds to the ratio factor calculation process.

The PU 52 then performs the processes of S42 to S50. The processes of S40a, S42 to S46, and S50 correspond to the zero point correction process.

Other Embodiments

The above embodiments can be modified as follows. The above embodiments and the following modifications can be combined as long as no technical contradiction arises.

First Sensor and Second Sensor

The combination of the first sensor and the second sensor is not limited to the one illustrated in the above embodiments. For example, the first sensor may be the yaw rate sensor 72 and the second sensor may be the steering angle sensor 70.
The combination of the first sensor and the second sensor is not limited to the combinations of any two of the following three sensors: the steering angle sensor 70, the yaw rate sensor 72, and the hitch angle sensor 74. For example, the second sensor may be either an acceleration sensor for detecting lateral acceleration or the wheel speed sensors 76. In this case, the first sensor may be either the steering angle sensor 70 or the yaw rate sensor 72. When the second sensor is the wheel speed sensors, the detection value to be zero-point corrected is the speed difference between the front wheel speeds $\Omega w1$, $\Omega w2$ or the speed difference between the rear wheel speeds $\Omega w3$, $\Omega w4$. This is a physical quantity that has a correlation with the yaw rate etc.

First Acquisition Process and Second Acquisition Process

In the above embodiments, the maximum value of the magnitude of the first detection value during a left turn and the maximum value of the magnitude of the first detection value during a right turn, such as the maximum values of the absolute values of the steered angle θt during a left turn and a right turn, are acquired. However, the present disclosure is not limited to this. For example, it is not particularly necessary to acquire the maximum values, and the first detection value during a left turn and the first detection value during a right turn may be acquired. Alternatively, for example, the first detection value during a left turn or a right turn and the first detection value while traveling straight may be acquired. Alternatively, for example, two first detection values of different magnitudes sampled during a right turn or a left turn may be acquired. In this case, the two first detection values are desirably the sampled values whose magnitudes (absolute values) are different from each other by a threshold or more. It is not essential that these two first detection values, namely the sampled values whose magnitudes are different from each other by the threshold or more, be the first detection values sampled during either a right turn period or a left turn period. The process of determining whether the condition (D) and the condition (F) are satisfied in the process of S30 in FIG. 3 is an example of the process of determining whether the magnitudes (absolute values) of the sampled values are different from each other by the threshold or more.
In the above embodiments, after the steered angle θt or yaw rate yr and the hitch angle β are sampled synchronously, their maximum and minimum values are extracted. This means that, for example, the maximum and minimum values of the steered angle θt or yaw rate yr and the minimum and maximum values of the hitch angle β are regarded as synchronously sampled values. However, the present disclosure is not limited to this, and the logic may be such that only synchronously sampled values are extracted.
In the above embodiments, the low-pass filtered sensor values are the hitch angles β to be acquired by the second acquisition process. However, the present disclosure is not limited to this. For example, a high-pass filtering may further be performed. When this modification is made to the first embodiment, it is possible to compensate for a delay in response to a change in hitch angle β with a change in steered angle θt.
The detection values to be acquired are not limited to the low-pass filtered values.
The first acquisition process is not limited to the process of acquiring two detection values. For example, as will be described in the section "Zero Point Estimation Process," detection values may be acquired sequentially when LDS is used etc.

Zero Point Estimation Process

In the above embodiments, the ratio factor K is the ratio between the difference between the maximum and minimum values and the minimum value of the first sensor. However, the ratio factor K is not limited to this. For example, the ratio factor K may be the ratio between the difference between the maximum and minimum values and the minimum value of the first sensor.

It is not essential that the ratio factor K be the ratio between the difference between the maximum and minimum values and the maximum value or minimum value of the first detection values. For example, as described in "First Acquisition Process and Second Acquisition Process," the ratio factor K may be the following factor when the maximum and minimum values are not acquired. That is, the ratio factor may be the ratio between the difference between two first detection values having different values and a non-zero point value of the two first detection values.

The process of converting the magnitude of the first detection value into the magnitude of the second detection value according to the ratio between the amount of change in first detection value indicated by a plurality of first detection values and the amount of change in second detection value indicated by a plurality of second detection values is not limited to the process illustrated in the above embodiments. For example, a plurality of ratios between the difference between two different values in the time series data of the steered angle θt and the difference between the values of their corresponding hitch angles β may be calculated by changing the two different values. The average value of these ratios may be used in the conversion process.

For example, the process may be the process of calculating each of the steered angles θt(1), θt(2), ..., and θt(n) multiplied by "(βmin−βmax)/(θtmax−θtmin)." In that case, the offset amount βoff may be the average value of the differences between each of these values and its corresponding hitch angle β(1), B(2), ..., β(n).

It is not essential that the zero point estimation process be the process of converting the magnitude of the first detection value into the magnitude of the second detection value according to the ratio between the amount of change in first detection value indicated by a plurality of first detection values and the amount of change in second detection value indicated by a plurality of second detection values. For example, the offset amount βoff may be the hitch angle β when the steered angle θt is zero.

For example, the hitch angle β estimated by inputting the time series data of the steered angle θt and the corresponding time series data of the hitch angle β to a learned model such as linear dynamics systems (LDS) may be used as a true value. In this case, the offset amount βoff can be the difference between the true value and the detected hitch angle β. Training data of the learned model is data using a zero-point corrected steered angle θt and a non zero-point corrected hitch angle β as input variables and a zero-point corrected hitch angle β as a target variable. This learned model is a model in which the similarity between the waveform of the time series data of the steered angle θt and the waveform of the time series data of the hitch angle β has been learned. The output of the learned model may be the offset amount βoff instead of the hitch angle β.

Control Device

The control device is not limited to the one that includes the PU 52 and the storage device 54 and that performs software processing. For example, the control device may include a dedicated hardware circuit, such as an ASIC, that processes at least part of the software processing performed in the above embodiments by hardware. That is, the control device may include a processing circuit with any of the following configurations (a) to (c).
(a) A processing circuit including: a processing device that performs all of the above processes according to a program; and a program storage device such as a storage device that stores the program.
(b) A processing circuit including: a processing device that performs part of the above processes according to a program; a program storage device; and a dedicated hardware circuit that performs the rest of the processes.
(c) A processing circuit including a dedicated hardware circuit that performs all of the above processes.

There may be a plurality of software execution devices including a processing device and a program storage device, and a plurality of dedicated hardware circuits.

Vehicle

The combination vehicle is not limited to the vehicle illustrated in FIG. 1. The vehicle is not limited to a combination vehicle.

While the present disclosure is described based on the embodiment, it is to be understood that the present disclosure is not limited to such an embodiment or structures. The present disclosure also includes various modifications and alterations that fall within the scope of equivalence. In addition, various combinations and forms, as well as other combinations and forms that include only one element or more or fewer elements, fall within the scope and spirit of the present disclosure.

It should be understood that the expression "at least one of A and B" as used herein means "only A, only B, or both A and B."

The invention claimed is:

1. A zero point estimation device that is applied to a vehicle equipped with a first sensor and a second sensor, wherein:
   the first sensor is configured to detect a physical quantity that changes according to a yaw motion of the vehicle;
   the second sensor is configured to detect a physical quantity that changes according to the yaw motion of the vehicle and that is different from the physical quantity to be detected by the first sensor;
   the first sensor has been subjected to zero point correction;
   the zero point estimation device is configured to perform a first acquisition process, a second acquisition process, and a zero point estimation process;
   the first acquisition process is a process of acquiring a plurality of first detection values sampled at different timings from each other while the vehicle is traveling with a change in a direction of travel;
   the first detection values are detection values of the first sensor;
   the second acquisition process is a process of acquiring a plurality of second detection values sampled in synchronization with sampling timings of the first detection values to be acquired by the first acquisition process;
   the second detection values are detection values of the second sensor; and the zero point estimation process is a process of estimating a zero point of the second sensor by using, as inputs, the plurality of first detection values acquired by the first acquisition process and the plurality of second detection values acquired by the second acquisition process.

2. The zero point estimation device according to claim 1, wherein the plurality of first detection values acquired by the first acquisition process includes values sampled at timings at which the vehicle has different steering angles from each other.

3. The zero point estimation device according to claim 1, wherein the plurality of first detection values acquired by the first acquisition process includes two first detection values whose magnitudes are different from each other by a threshold or more.

4. The zero point estimation device according to claim 1, wherein the plurality of first detection values acquired by the first acquisition process includes a value sampled during a right turn of the vehicle and a value sampled during a left turn of the vehicle.

5. The zero point estimation device according to claim 1, wherein:
the vehicle is a tractor configured to control a steered angle of a steered wheel;
a trailer that is towed by the tractor is connectable to the tractor;
either the first sensor or the second sensor is a hitch angle sensor;
the hitch angle sensor is configured to detect a hitch angle that is an angle between a front-rear direction of the tractor and a front-rear direction of the trailer; and
the zero point estimation device is configured to perform sampling of the first detection values to be acquired by the first acquisition process on condition that a predetermined period of time has elapsed since the vehicle started to move.

6. The zero point estimation device according to claim 1, wherein the zero point estimation process is a process of calculating the zero point by converting magnitudes of the first detection values into magnitudes of the second detection values according to a ratio between an amount of change in the first detection value indicated by the plurality of first detection values and an amount of change in the second detection value indicated by the plurality of second detection values.

7. The zero point estimation device according to claim 6, wherein:
the zero point estimation process includes
a ratio factor calculation process of calculating a ratio factor that is a ratio between a difference between two of the first detection values and a predetermined first detection value, and
a process of calculating an estimated value of the second detection value according to a product of a difference between two of the second detection values and the ratio factor;
the predetermined first detection value is a detection value that is not a zero point out of the plurality of first detection values; and
the two second detection values are the second detection values corresponding to the two first detection values.

8. The zero point estimation device according to claim 1, wherein:
the zero point estimation device is configured to perform a zero point correction process and an operation process;

the zero point correction process is a process of correcting the second detection value according to the zero point estimated by the zero point estimation process; and
the operation process is a process of operating a predetermined device based on the second detection value corrected by the zero point correction process.

9. The zero point estimation device according to claim 1, wherein:
the zero point estimation device is configured to perform an instruction process of instructing a user of the vehicle to drive the vehicle under a predetermined driving condition;
the predetermined driving condition is a driving condition that changes the direction of travel of the vehicle; and
the zero point estimation device is configured to perform the first acquisition process during driving of the vehicle after the instruction process.

10. The zero point estimation device according to claim 1, wherein
the vehicle is a tractor configured to control a steered angle of a steered wheel,
a trailer that is towed by the tractor is connectable to the tractor,
the first sensor and the second sensor are any two of three sensors: a steering angle sensor; a yaw rate sensor; and a hitch angle sensor, and
the hitch angle sensor is configured to detect a hitch angle that is an angle between a front-rear direction of the tractor and a front-rear direction of the trailer.

11. A zero point estimation method that is applied to a vehicle equipped with a first sensor and a second sensor,
the first sensor being configured to detect a physical quantity that changes according to a yaw motion of the vehicle,
the second sensor being configured to detect a physical quantity that changes according to the yaw motion of the vehicle and that is different from the physical quantity to be detected by the first sensor, and
the first sensor having been subjected to zero point correction, the zero point estimation method comprising:
performing a first acquisition process;
performing a second acquisition process; and
performing a zero point estimation process, wherein
the first acquisition process is a process of acquiring a plurality of first detection values sampled at different timings from each other while the vehicle is traveling with a change in a direction of travel,
the first detection values are detection values of the first sensor,
the second acquisition process is a process of acquiring a plurality of second detection values sampled in synchronization with sampling timings of the first detection values to be acquired by the first acquisition process,
the second detection values are detection values of the second sensor, and
the zero point estimation process is a process of estimating a zero point of the second sensor by using, as inputs, the plurality of first detection values acquired by the first acquisition process and the plurality of second detection values acquired by the second acquisition process.

12. A non-transitory computer-readable medium storing a zero point estimation program that is applied to a vehicle equipped with a first sensor and a second sensor, the first sensor being configured to detect a physical quantity that changes according to a yaw motion of the vehicle, the second sensor being configured to detect a physical quantity that changes according to the yaw motion of the vehicle and that is different from the physical quantity to be detected by the first sensor, and the first sensor having been subjected to zero point correction, the zero point estimation program comprising instructions to cause a computer to perform a first acquisition process, a second acquisition process, and a zero point estimation process, wherein:

the first acquisition process is a process of acquiring a plurality of first detection values sampled at different timings from each other while the vehicle is traveling with a change in a direction of travel;

the first detection values are detection values of the first sensor;

the second acquisition process is a process of acquiring a plurality of second detection values sampled in synchronization with sampling timings of the first detection values to be acquired by the first acquisition process;

the second detection values are detection values of the second sensor; and the zero point estimation process is a process of estimating a zero point of the second sensor by using, as inputs, the plurality of first detection values acquired by the first acquisition process and the plurality of second detection values acquired by the second acquisition process.

* * * * *